United States Patent
Hikichi et al.

(10) Patent No.: US 11,360,836 B2
(45) Date of Patent: Jun. 14, 2022

(54) RECEIVING TERMINAL, COMMUNICATION SYSTEM, AND PROGRAM

(71) Applicant: KIOXIA CORPORATION, Tokyo (JP)

(72) Inventors: Mari Hikichi, Yokohama Kanagawa (JP); Yuki Kanbe, Fujisawa Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/186,464

(22) Filed: Feb. 26, 2021

(65) Prior Publication Data

US 2022/0004447 A1 Jan. 6, 2022

(30) Foreign Application Priority Data

Jul. 2, 2020 (JP) .............................. JP2020-115023

(51) Int. Cl.
*G06F 11/00* (2006.01)
*G06F 11/07* (2006.01)
*G06F 11/32* (2006.01)

(52) U.S. Cl.
CPC ........ *G06F 11/073* (2013.01); *G06F 11/0757* (2013.01); *G06F 11/0772* (2013.01); *G06F 11/327* (2013.01)

(58) Field of Classification Search
CPC ............... G06F 11/073; G06F 11/0757; G06F 11/0772; G06F 11/327; G06F 11/321; G06F 11/366; G06F 11/0775; G06F 11/328; G06F 11/324
See application file for complete search history.

(56) References Cited

U.S. PATENT DOCUMENTS

| 9,277,077 | B2 | 3/2016 | Higashi |
| 2010/0157671 | A1 | 6/2010 | Mokhlesi |
| 2012/0209939 | A1 | 8/2012 | Ito et al. |

(Continued)

FOREIGN PATENT DOCUMENTS

| JP | 2008-305451 A | 12/2008 |
| JP | 2012-168865 A | 9/2012 |
| JP | 2014-225210 A | 12/2014 |

(Continued)

OTHER PUBLICATIONS

Taiwanese Office Action dated Jan. 4, 2022 in related Taiwanese Patent Application 110113872 (with English Translation), 33 pages.

*Primary Examiner* — Katherine Lin
(74) *Attorney, Agent, or Firm* — Kim & Stewart LLP

(57) ABSTRACT

A communication system includes a host, and a memory system including a non-volatile memory and a controller configured to execute operations including writing of data to the non-volatile memory based on a request from the host. Information is transmitted by one of the host or the memory system after a predetermined period has elapsed while power is supplied from the host to the non-volatile memory. The information includes a number for identifying either the host or the memory system that transmitted the information and diagnostic information used for determining if there is a risk of loss of data stored in the non-volatile memory.

20 Claims, 12 Drawing Sheets

(56) References Cited

U.S. PATENT DOCUMENTS

2016/0179406 A1\* 6/2016 Gorobets ............ G11C 11/5628
           711/103
2019/0215015 A1\* 7/2019 Kanno .................... G06F 11/10

FOREIGN PATENT DOCUMENTS

JP      6018113 B2   11/2016
TW   201027541 A    7/2010

\* cited by examiner

FIG. 6

| INSPECTION ITEM NAME | CURRENT VALUE (Value) | THRESHOLD VALUE (Threshold) | RAW VALUE |
|---|---|---|---|
| POWER-ON TIME | 50 | 100 | 0000AAC0000B |
| NUMBER OF TIMES OF WRITING | 50 | 100 | 000000FAEEEE |
| NUMBER OF TIMES OF ERASING | 100 | 100 | 000000000030 |

US 11,360,836 B2

RECEIVING TERMINAL, COMMUNICATION SYSTEM, AND PROGRAM

CROSS-REFERENCE TO RELATED APPLICATION

This application is based upon and claims the benefit of priority from Japanese Patent Application No. 2020-115023, filed Jul. 2, 2020, the entire contents of which are incorporated herein by reference.

FIELD

Embodiments described herein relate generally to a receiving terminal, a communication system, and a program.

BACKGROUND

A solid state drive (SSD) equipped with a non-volatile semiconductor memory, such as a NAND flash memory, is known as one example of a memory system. The SSD is connected to various host devices such as a computer and is used as a storage device thereof. In addition, a communication system having a communication function provided in the SSD to enable communication with the outside has been employed.

DESCRIPTION OF THE DRAWINGS

FIG. 6 is a diagram showing an example of a list of diagnostic information used for determining if there is a risk of loss of data stored in a non-volatile memory according to the first embodiment.

DETAILED DESCRIPTION

Figure 1:
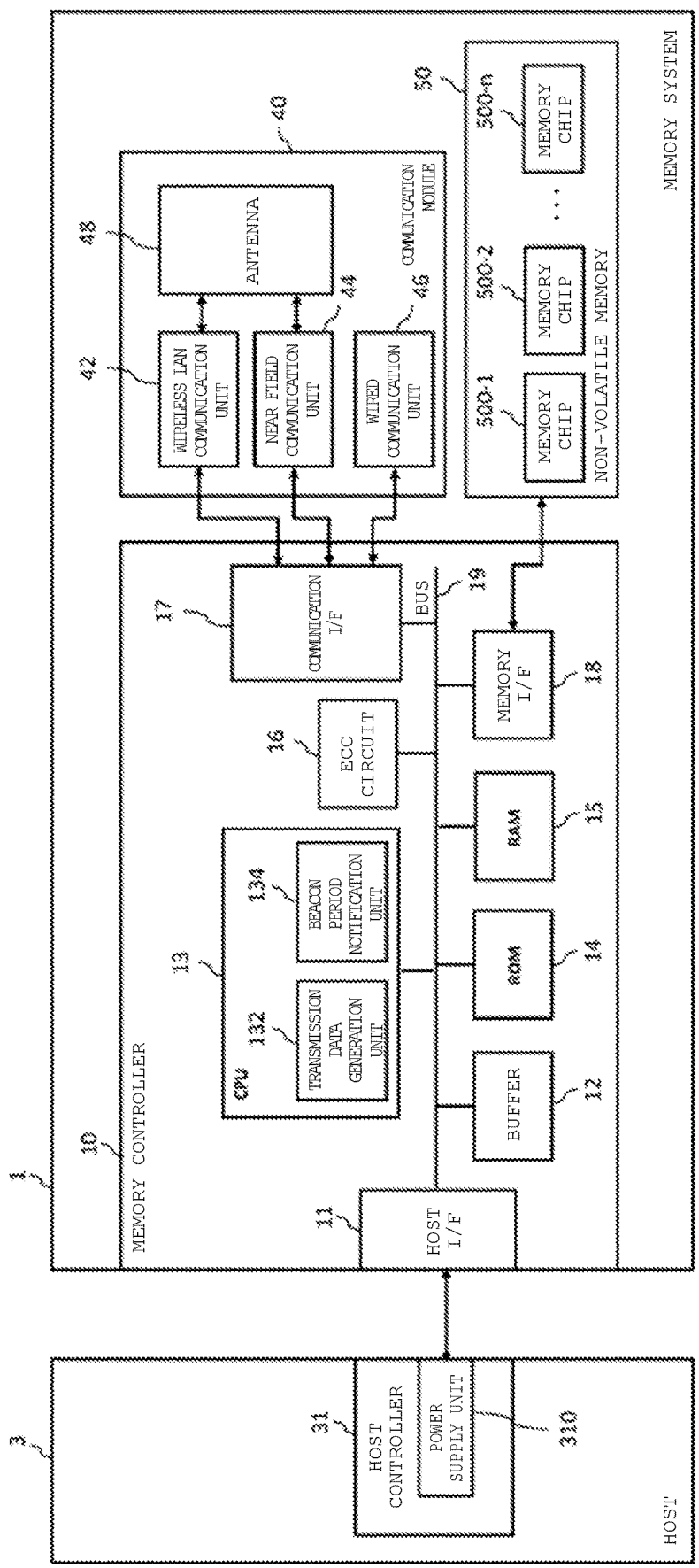
FIG. 1 is a diagram showing an example of an overall configuration of a memory system, according to a first embodiment.

Embodiments provide a receiving terminal, a communication system, and a program capable of reducing a risk of data loss.

In general, according to one embodiment, a communication system includes a host, and a memory system including a non-volatile memory and a controller configured to execute operations including writing of data to the non-volatile memory based on a request from the host. Information is transmitted by one of the host or the memory system after a predetermined period has elapsed while power is supplied from the host to the non-volatile memory. The information includes a number for identifying either the host or the memory system that transmitted the information and diagnostic information used for determining if there is a risk of loss of data stored in the non-volatile memory.

Hereinafter, embodiments will be described with reference to the drawings. In the following description, elements having the same function and configuration are given the same reference numerals. Each embodiment to be described below illustrates an example of a device or a method that embodies the technical concept of the embodiment, and arrangement of elements, a connection relationship between the elements, and the like are not limited to the embodiments which will be described below.

Each functional block can be implemented as hardware, computer software, or the combination of both of hardware and computer software. For this reason, in order to clearly illustrate that each functional block can be any of hardware, computer software, or a combination, descriptions will be made in terms of their functionalities in general. It is not necessary that functional blocks are distinguished as in the following examples. For example, some of the functional blocks may be implemented by functional blocks different from those illustrated below. The illustrated functional blocks may be divided into functional sub-blocks.

FIG. 1 is a block diagram showing an example of an overall configuration of a memory system 1 connected to a host 3. The memory system 1 is, for example, a flash memory such as an SD® card or an SSD. The memory system 1 operates with power supplied from a power supply unit 310, to be described below, when connected to the host 3, and performs processing in accordance with an access from the host 3. The memory system 1 includes a memory controller 10, a communication module 40, and a non-volatile memory 50.

The memory controller 10 includes, for example, a host interface (I/F) 11, a buffer 12, a central processing unit (CPU) 13, a read-only memory (ROM) 14, a random-access memory (RAM) 15, an error checking and correcting (ECC) circuit 16, a communication interface (I/F) 17, and a memory interface (I/F) 18. These are connected by a bus 19.

The host I/F 11 performs interface processing between the memory controller 10 and the host 3.

The buffer 12 temporarily stores a certain amount of data, for example, one page, when data received from the host 3 is to be written to, for example, the non-volatile memory 50, or temporarily stores a certain amount of data when data read from the non-volatile memory 50 is to be sent out to the host 3. A page is a data unit in which writing and reading are generally performed on NAND flash memory.

The CPU 13 controls operations of the entire memory system 1. The program for controlling the CPU 13 executes predetermined processing by using firmware such as a control program stored in the ROM 14 or by loading a program stored in the ROM 14 into the RAM 15. By executing the predetermined processing, the CPU 13 stores various tables in the RAM 15, receives a write command, a read command, and an erase command from the host 3, and performs writing, reading, and erasing of data in the non-volatile memory 50. Data transfer such as writing data to the non-volatile memory 50 and reading data from the non-volatile memory 50 is performed with the host 3 via the memory I/F 18, the buffer 12, the host I/F 11, and the like.

Further, the CPU 13 executes internal processing in the memory system 1 such as patrol and refreshing. The memory system 1 may patrol and refresh periodically while the power is supplied from the host 3.

Patrol is processing for reading, by a predetermined unit, the data stored in, for example, the non-volatile memory 50, to detect a block with errors in the storage of the data, and also includes processing for checking, by the ECC circuit 16, the errors in the read data. In the checking processing, the ECC circuit 16 checks whether a number of error bits in the read data exceeds a threshold value for refreshing, by comparing the number of error bits of the read data with the threshold value. If a block storing read data having a number of error bits exceeding the threshold value is detected, valid data in the detected block is rewritten to another block. A block is a data unit in which erasing is generally performed on NAND flash memory.

For example, when the number of error bits of data read from a certain page exceeds the threshold value, the CPU 13 refreshes the data in the block that includes the page. That is, CPU 13 rewrites, to another block, the data written to the block that includes the page in which the number of error bits exceeds the threshold value. Then, the CPU 13 invalidates the data written in the original block.

The CPU 13 is programmed to function as a transmission data generation unit 132 and a beacon period notification unit 134. The transmission data generation unit 132 generates a beacon, which will be described later, for transmission to a receiving terminal 2 (not shown in FIG. 1).

The beacon period notification unit 134 sets a period for transmitting a beacon to the receiving terminal 2, for example, an interval of once every 100 milliseconds. A vendor of the memory system 1 may change the period of transmitting the beacon later, even when it has initially been set to a fixed value. For example, the beacon period notification unit 134 may change the period of transmitting the beacon using a "SetFeature" command.

For example, the beacon is information that the memory system 1 periodically transmits to notify surrounding devices, e.g., the receiving terminal 2, of a status of the memory system 1, and is transmitted as a frame or a packet. According to the first embodiment, when the receiving terminal 2 receives the beacon transmitted from the memory system 1, the receiving terminal 2 can recognize that the memory system 1 is receiving power from the host 3. On the other hand, when the receiving terminal 2 does not receive the beacon for a long time, the receiving terminal 2 can recognize that the power of the host 3 is turned off or that the memory system 1 is not connected to the host 3.

The ROM 14 stores firmware such as a control program used by the CPU 13. The RAM 15 is, for example, a semiconductor memory such as a dynamic RAM (DRAM), and is used as a work area of the CPU 13. The RAM 15 stores the firmware for managing the memory system 1, various management tables, and the like.

The ECC circuit 16 performs error detection and error correction processing. More specifically, at the time of writing data received from the host 3, an ECC code is generated for each set of the data. Further, at the time of reading data, decoding is performed based on the ECC code to detect whether or not an error exists. When an error is detected, a position of the bit is specified, and the error is corrected.

The communication I/F 17 performs interface processing with the communication module 40. The communication I/F 17 transfers the beacon generated by the transmission data generation unit 132 to the communication module 40.

The memory I/F 18 performs interface processing between the memory controller 10 and the non-volatile memory 50.

The communication module 40 receives the beacon generated by the transmission data generation unit 132 from the communication I/F 17 and transmits the beacon to the receiving terminal 2. The communication module 40 includes a wireless local area network (LAN) communication unit 42, a near field communication unit 44, and a wired communication unit 46. An antenna 48 for transmitting and receiving high-frequency signals is connected to the wireless LAN communication unit 42 and the near field communication unit 44.

The wireless LAN communication unit 42 is a circuit that controls a wireless communication function by, for example, Wi-Fi®. The wireless LAN communication unit 42 performs wireless LAN signal processing. The near field communication unit 44 is a circuit that controls a near field communication function by, for example, Bluetooth®. The wired communication unit 46 is a circuit that controls a wired communication function.

The non-volatile memory 50 is, for example, a NAND flash memory including a memory cell having a stacked gate structure or a memory cell having a MONOS structure. In the NAND flash memory, writing and reading are generally performed in units of pages, and erasing is generally performed in units of blocks. The non-volatile memory 50 includes a plurality of memory chips 500. FIG. 1 shows memory chips 500-1 to 500-$n$, n being a natural number of 1 or more, as an example. Each of the memory chips 500 can operate independently of each other.

Figure 2:
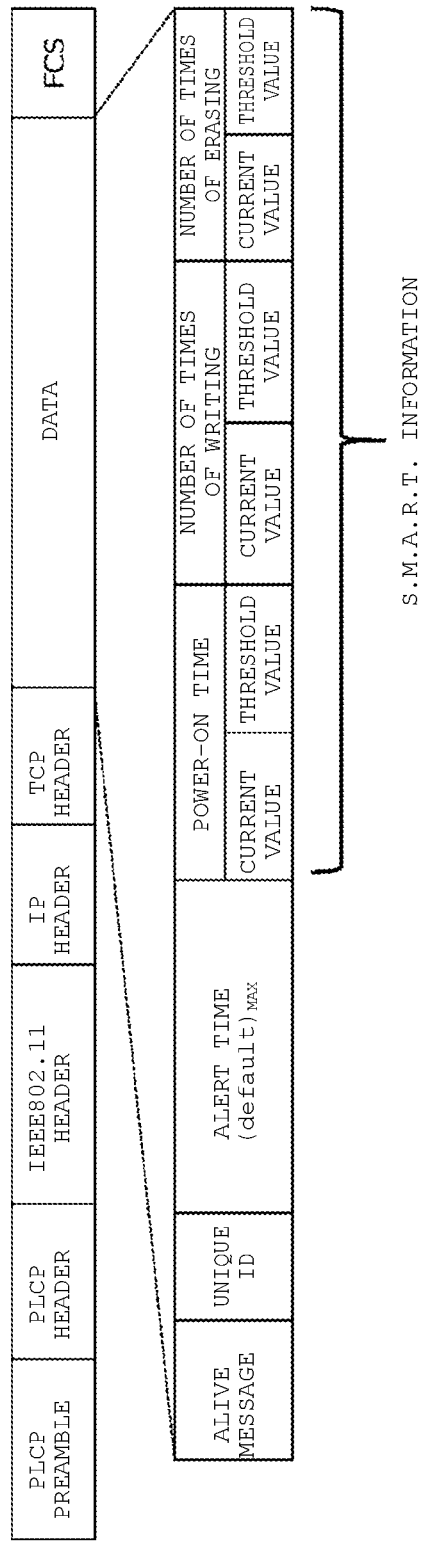
FIG. 2 is a diagram showing an example of a configuration of a beacon, according to the first embodiment.

FIG. 2 is a diagram showing an example of a beacon configuration. The beacon has a PLCP preamble, a PLCP header, an IEEE802.11 header, an IP header, a TCP header, data, and an FCS. In addition, the data includes an alive message, a unique ID, an alert time (default)$_{MAX}$ and Self-Monitoring Analysis and Reporting Technology (S.M.A.R.T.) information. S.M.A.R.T. is a self-diagnosis function for early detecting fault and predicting failure of an SDD, a hard disk drive (HDD), and the like. The S.M.A.R.T. information is information regarding respective inspection items in the S.M.A.R.T. such as a temperature of the SDD and HDD and the number of errors.

FIG. 2 shows current values and threshold values each regarding a power-on time, a number of times of writing, and a number of times of erasing, as the S.M.A.R.T. information. The power-on time is the total time since the power of the host 3 was turned on, that is, a use time of the non-volatile memory 50. The number of times of writing is the number of times of writing of data to the non-volatile memory 50. The number of times of erasing is the number of times of erasing the data written in the non-volatile memory 50. In the first embodiment, a case in which as the power-on time, the number of times of writing, and the number of times of erasing increase, that is, as a degree of wear-out of the non-volatile memory 50 increases, the current values increase, will be described as an example.

In addition, the S.M.A.R.T. information may include the temperature of the non-volatile memory 50, the number of errors detected by the ECC circuit 16, and the like. When the memory system 1 does not have the S.M.A.R.T. function, the information is not transmitted. When the vendor of the memory system 1 sets a threshold value for the respective inspection items in advance, the threshold values are transmitted together with the current values. When the vendor of the memory system 1 does not set the threshold value for the respective inspection items in advance, a user of the receiving terminal 2 may set appropriate values.

The alive message serves to explicitly indicate that the power of the host 3 is turned on. When the receiving terminal 2 receives a beacon, the alive message indicates to the receiving terminal 2 that the power of the host 3 corresponding to the received beacon is turned on.

The unique ID is an optional number for identifying a transmission source of the beacon. The unique ID is, for example, an optional number unique to the memory system 1. When the beacon is wirelessly transmitted from the memory system 1, for example, its own MAC address in the IEEE802.11 header may be used for identifying the memory system 1 instead of the unique ID.

The alert time (default) is an upper limit of the alert time (default), which will be described below. The alert time (default) is set by the vendor of the memory system 1 for each model of the memory system 1. The alert time (default) needs to be set because the memory system 1 has a different timing to be refreshed depending on the model of the memory system 1. The vendor of the memory system 1 sets the alert time (default) to be less than or equal to the upper limit, and the user of the receiving terminal 2 may appropriately change the alert time (default).

Figure 3:
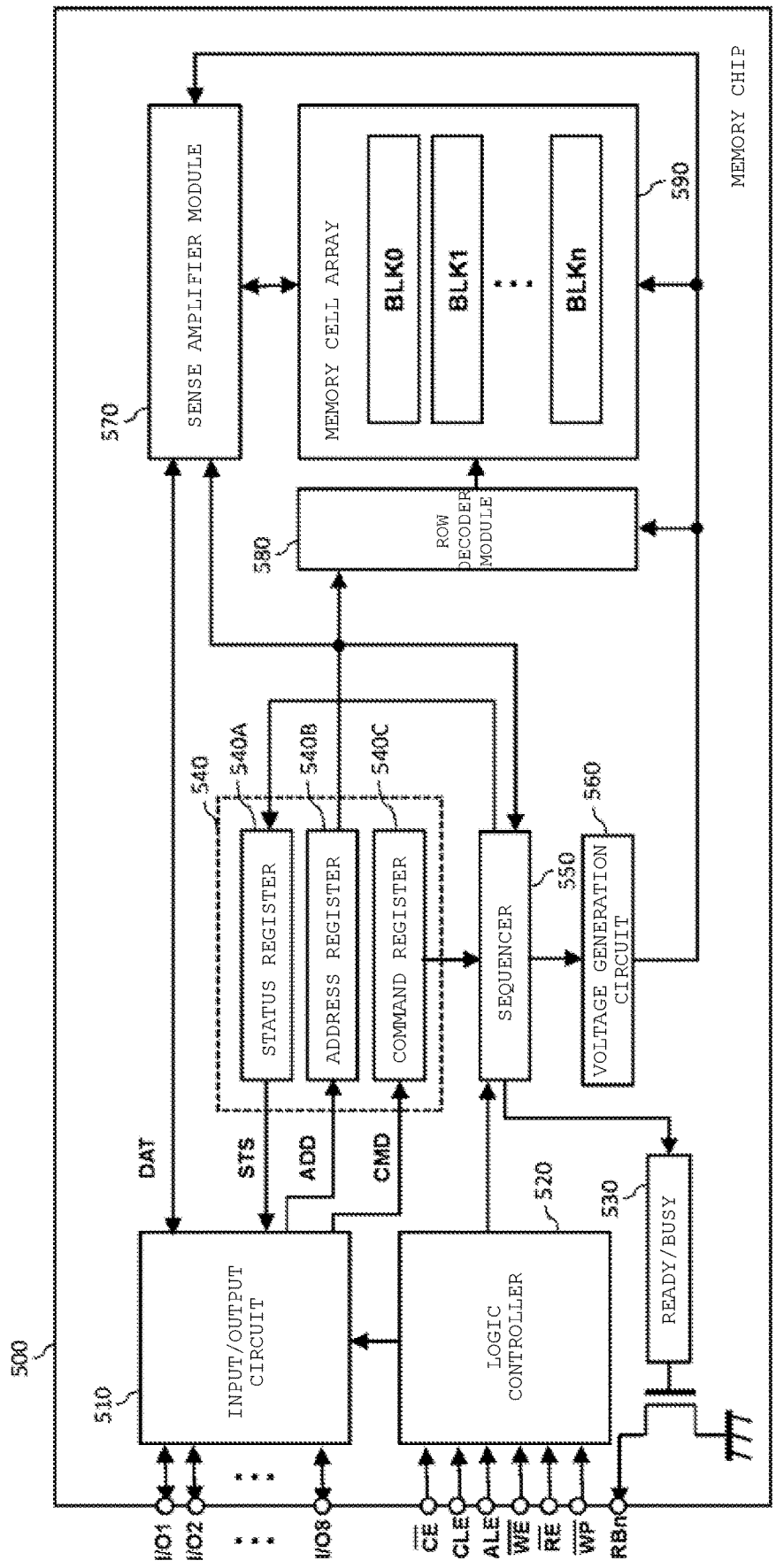
FIG. 3 is a diagram showing an example of an overall configuration of a memory chip, according to the first embodiment.

Next, a configuration example of the memory chip 500 will be described with reference to FIG. 3. FIG. 3 is a block diagram showing an example of the configuration of the memory chip 500. As shown in FIG. 3, the memory chip 500 includes an input/output circuit 510, a logic controller 520, a ready/busy control circuit 530, registers 540, a sequencer 550, a voltage generation circuit 560, a sense amplifier module 570, a row decoder module 580, and a memory cell array 590.

The input/output circuit 510 transmits and receives, for example, 8-bit-wide input/output signals I/O (I/O 1 to I/O 8) to and from the memory controller 10. For example, the input/output circuit 510 transfers to the sense amplifier module 570, write data DAT included in the input/output signal I/O received from the memory controller 10. Further, the input/output circuit 510 transmits, to the memory controller 10, read data DAT transferred from the sense amplifier module 570 as an input/output signal I/O.

The logic controller 520 controls the input/output circuit 510 and the sequencer 550 based on various control signals received from the memory controller 10. As the various control signals, for example, a chip enable signal /CE, a command latch enable signal CLE, an address latch enable signal ALE, a write enable signal /WE, a read enable signal /RE, and a write protect signal /WP are used. The signal /CE is a signal for enabling the memory chip 500. The signal CLE is a signal for notifying the input/output circuit 510 that a signal input to the memory chip 500 in parallel with the asserted signal CLE is a command CMD. The signal ALE is a signal for notifying the input/output circuit 510 that a signal input to the memory chip 500 in parallel with the asserted signal ALE is address information ADD. The signals /WE and /RE are, for example, signals that command the input and output of the input/output signal I/O to the input/output circuit 510, respectively. The signal /WP is a signal for bringing the memory chips 500 into a protecting state, for example, when the power is turned on and off.

The ready/busy control circuit 530 generates a ready/busy signal RBn based on an operating state of the sequencer 550. The signal RBn is a signal that notifies the memory controller 10 whether the memory chip 500 is in a ready state for accepting a command or in a busy state for not accepting the command, from the memory controller 10.

The registers 540 includes a status register 540A, an address register 540B, and a command register 540C. The status register 540A stores, for example, status information STS of the sequencer 550, and transfers the status information STS to the input/output circuit 510 based on the instruction of the sequencer 550. The address register 540B stores address information ADD transferred from the input/output circuit 510. A block address, a column address, and a page address, which are included in the address information ADD, are used by the row decoder module 580, the sense amplifier module 570, and the voltage generation circuit 560, respectively. The command register 540C stores the command CMD transferred from the input/output circuit 510.

The sequencer 550 controls the operation of the entire memory chip 500 based on the command CMD stored in the command register 540C. For example, the sequencer 550 controls the voltage generation circuit 560, the sense amplifier module 570, the row decoder module 580, and the like to execute various operations such as a write operation and a read operation.

The voltage generation circuit 560 generates a desired voltage based on the control of the sequencer 550, and supplies the generated voltage to the sense amplifier module 570, the row decoder module 580, the memory cell array 590, and the like. For example, the voltage generation circuit 560 applies a desired voltage to each of a signal line corresponding to a selection word line and a signal line corresponding to a non-selection word line, based on the page address stored in the address register 540B.

The sense amplifier module 570 outputs the data DAT read from the memory cell array 590 to the memory controller 10 via the input/output circuit 510. Further, the sense amplifier module 570 transfers the write data DAT received from the memory controller 10 via the input/output circuit 510 to the memory cell array 590.

The row decoder module 580 selects a block BLK to execute various operations based on the block address stored in the address register 540B. Then, the row decoder module 580 transfers a voltage supplied from the voltage generation circuit 560 to the selected block BLK.

The memory cell array 590 includes a plurality of block BLKs, each block including a plurality of non-volatile memory cells associated with rows and columns. FIG. 3 shows blocks BLK0 to BLKn, n being a natural number of 1 or more, as an example. The memory cell array 590 stores the data provided by the memory controller 10.

Figure 4:
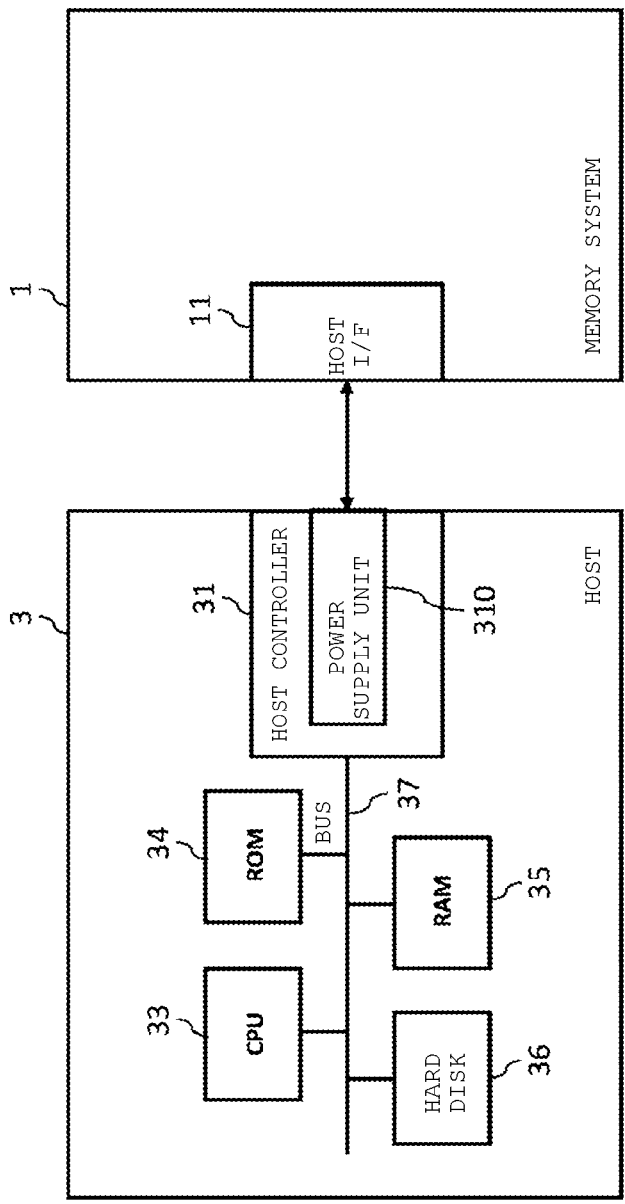
FIG. 4 is a diagram showing an example of an overall configuration of a host connected to the memory system, according to the first embodiment.

FIG. 4 is a block diagram showing an example of the overall configuration of the host 3 connected to the memory system 1. For example, a digital camera, a mobile phone, a personal computer, or the like can be the host 3. The host 3 includes a host controller 31, a CPU 33, a ROM 34, a RAM 35, a hard disk 36 (and/or an SSD), for example. These hardware components are connected by a bus 37. In the following description, the host 3 is also referred to as a transmission terminal 3.

The host controller 31 performs interface processing with the memory system 1 while connected to the memory system 1. Further, the host controller 31 issues various commands according to instructions of the CPU 33.

The host controller 31 has a power supply unit 310. The power supply unit 310 supplies power to the memory system 1. The memory system 1 operates with power supplied from a power supply unit 310 when connected to the host 3, and performs processing in accordance with an access from the host 3.

The CPU 33 controls the entire host 3. The ROM 34 stores firmware required for the operation of the CPU 33. The RAM 35 is used as a work area of the CPU 33, and, for example, a program that can be executed by the CPU 33 is also loaded into and executed from the RAM 35. The hard disk 36 stores various data.

Figure 5:
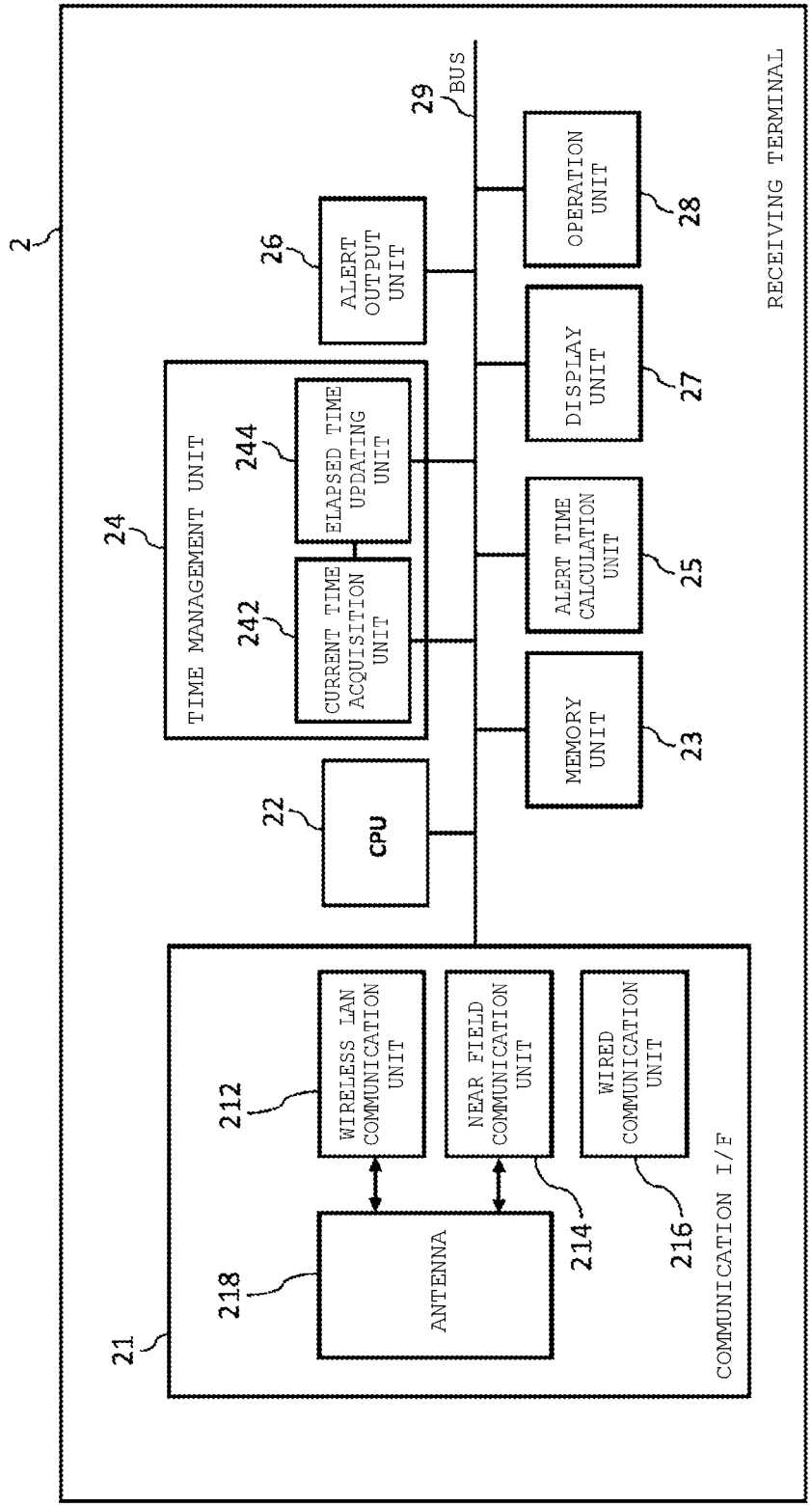
FIG. 5 is a diagram showing an example of an overall configuration of a receiving terminal, according to the first embodiment.

FIG. 5 is a block diagram showing an example of an overall configuration of the receiving terminal 2. The receiving terminal 2 is a terminal for operating various software applications. The receiving terminal 2 is, for example, a smart phone, a tablet, a mobile phone, or a personal computer. It is preferable that the receiving terminal 2 is portable so that the user can check information received from the transmission terminal 3 at any time.

The receiving terminal 2 includes, for example, a communication I/F 21, a CPU 22, a memory unit 23, a time management unit 24, an alert time calculation unit 25, an alert output unit 26, a display unit 27, and an operation unit 28. These components are connected by a bus 29.

The communication I/F 21 is an interface circuit that receives a beacon from the memory system 1. The communication I/F 21 includes a wireless LAN communication unit 212, a near field communication unit 214, a wired communication unit 216, and an antenna 218. The antenna 218 transmits and receives high-frequency signals and is connected to the wireless LAN communication unit 212 and the near field communication unit 214.

The wireless LAN communication unit 212 is a circuit that communicates with the memory system 1 by a wireless LAN, and the near field communication unit 214 is a circuit that communicates with the memory system 1 by near field communication. The near field communication here includes, for example, Bluetooth and near field communication (NFC). The wired communication unit 216 is a circuit that communicates with the memory system 1 by wire.

The antenna 218 performs wireless communication with the antenna 48 of the memory system 1 by the wireless LAN or near field communication.

The CPU 22 controls the entire receiving terminal 2. The CPU 22 retrieves information that is required to perform the functions of the receiving terminal 2 such as a unique ID of the memory system 1 and S.M.A.R.T. information from a received beacon, and transfers the required information to the memory unit 23.

The memory unit 23 stores information and programs required to perform the functions of the receiving terminal 2. As the memory unit 23, a ROM, a RAM, a semiconductor memory device such as a flash memory, a storage device such as an HDD or SSD, and other storage media may be used. For example, the unique ID of the memory system 1, the S.M.A.R.T. information, and the time when the receiving terminal 2 receives the beacon may be stored in the memory unit 23.

The time management unit 24 is a circuit that manages an elapsed time since the beacon including the unique ID corresponding to the memory system 1 was most recently received. The time management unit 24 has a current time acquisition unit 242 and an elapsed time updating unit 244, each of which is a circuit. The current time acquisition unit 242 is connected to the elapsed time updating unit 244 via the bus 29.

As the current time acquisition unit 242, for example, a timer that clocks the current time is used. Although a timer may be provided inside the receiving terminal 2, information regarding the time may also be acquired from outside of the receiving terminal 2, for example.

The elapsed time updating unit 244 calculates the elapsed time as a difference between the time when the beacon including the unique ID corresponding to the memory system 1 was most recently received and the current time. Further, the elapsed time updating unit 244 updates the information regarding the elapsed time stored in the memory unit 23 to the latest calculated elapsed time.

The alert time calculation unit 25 is a circuit that calculates a time to issue an alert by the alert output unit 26, referred to herein as an alert time, and transmits to the alert output unit 26 the time. An example of a method of calculating the alert time will be described below.

FIG. 6 shows a list of the S.M.A.R.T. information corresponding to the memory system 1. The data corresponding to the list of the S. M. A. R. T information is stored in the memory unit 23. FIG. 6 shows the power-on time, the number of times of writing, and the number of times of erasing as an example of the respective inspection items. First, a power-on time ratio, expressed in Equation (1) (below), is calculated based on the current value and the threshold value of the power-on time shown in FIG. 6. Further, a number-of-times-of-writing ratio, expressed in Equation (2) (below), and a number-of-times-of-erasing ratio, expressed in Equation (3) (below) are also calculated in a similar manner. When the memory system 1 does not have the S.M.A.R.T. function and therefore the alert time calculation unit 25 cannot perform equations (1)-(3), the power-on time ratio, number-of-times-of-writing ratio, and number-of-times-of-erasing ratio each equal zero.

$$\text{Power-on time ratio} = \text{Current value (Power-on time)} / \text{Threshold value (Power-on time)} \quad (1)$$

$$\text{Number-of-times-of-writing ratio} = \text{Current value (Number of times of writing)} / \text{Threshold value (Number of times of writing)} \quad (2)$$

$$\text{Number-of-times-of-erasing ratio} = \text{Current value (Number of times of erasing)} / \text{Threshold value (Number of times of erasing)} \quad (3)$$

When any of the ratios in the above Equations (1) to (3) is greater than or equal to 1, the memory system 1 may be nearing the end of its lifespan. Therefore, the alert time calculation unit 25 transmits to the alert output unit 26 an alert issuing request to issue an alert that instructs the user to back up the data in the memory system 1 to another storage medium.

On the other hand, when any of the ratios in the above Equations (1) to (3) is less than 1, the alert time is calculated by the following Equation (4).

$$\text{Alert time} = \text{Alert time (default)} \times \{1 - (\text{Power-on time ratio} + \text{Number-of-times-of-writing ratio} + \text{Number-of-times-of-erasing ratio})/3\} \quad (4)$$

When the elapsed time since the beacon including the unique ID corresponding to the memory system 1 was most recently received exceeds the alert time calculated by the above Equation (4), the memory system 1 is in a state in which the memory system 1 is not continuously supplied with power. Thus, the data in the non-volatile memory 50 will be lost due to natural discharge. Therefore, the alert time calculation unit 25 transmits to the alert output unit 26 an alert issuing request to instruct the user to turn on the power of the transmission terminal 3. The alert time may also be set to an optional time based on a user's preference or the like without performing the above-described calculation.

When the alert issuing request is received from the alert time calculation unit 25, the alert output unit 26, which is, e.g., a circuit, issues an alert. The alert is displayed for instructing the user to turn on the power of the host 3 or to back up the data in the memory system 1 to another storage medium. Alternatively, the alert may be a vibration, light, sound, or the like. For example, the alert output unit 26 notifies the user of a message prompting the user to back up the data in the memory system 1 to another storage medium. The user, who is aware of the alert, can back up the data in the memory system 1 to a new SSD, SD card, or the like. In another example, the alert output unit 26 notifies the user of a message prompting the user to turn on the power of the host 3. The user, who is aware of the alert, can connect the memory system 1 to the host 3 and turn on the power of the host 3.

The display unit 27 displays required information when executing a predetermined function of the receiving terminal 2 or selecting a function to be executed. As the display unit 27, a liquid crystal display (LCD), an organic EL element, or the like is used. To issue an alert to the user of an instruction, the alert output unit 26 may transmit the instruction to the display unit 27, and the display unit 27 may then display the instruction to the user.

The operation unit 28 allows the user to input information such as characters and select a function. As the operation unit 28, a touch panel, a keyboard, a mouse, or the like may be used. If the operation unit 28 is a touch panel, the operation unit 28 is superimposed on the display unit 27, and the user may operate the touch panel by touching a predetermined display area to perform an input operation.

Figure 7:
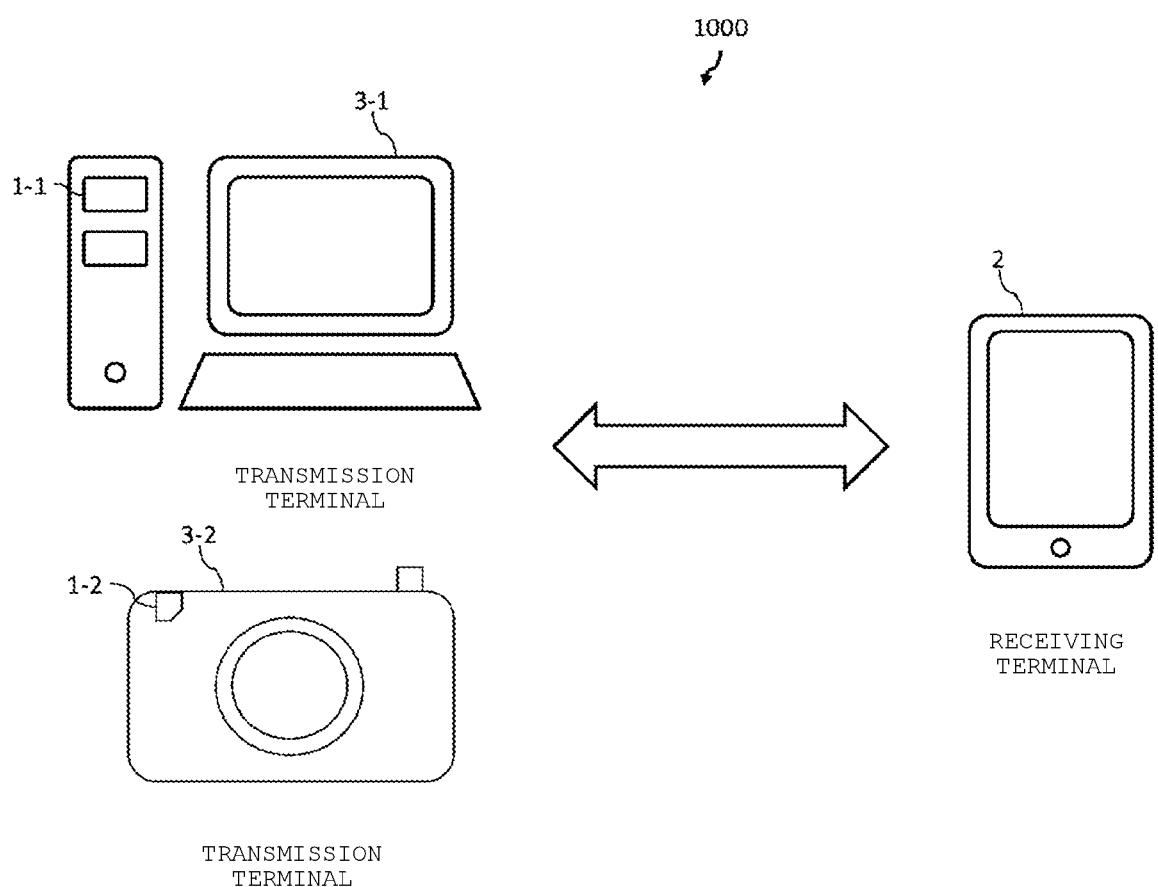
FIG. 7 is a diagram showing an example of an overall configuration of a communication system, according to the first embodiment.

FIG. 7 is a block diagram showing an example of an overall configuration of a communication system 1000. The communication system 1000 includes a plurality of memory systems 1, the receiving terminal 2, and a plurality of transmission terminals 3. In the communication system 1000 shown in FIG. 7, the plurality of memory systems 1 are managed by the one receiving terminal 2. For example, the memory systems 1-1 and 1-2 are an SSD and an SD card, respectively. The transmission terminals 3-1 and 3-2 are a personal computer and a digital camera, respectively. The receiving terminal 2 is a smart phone. The memory systems 1 are connected to the transmission terminals 3, such that the beacon including the unique ID corresponding to each memory system 1 can be transmitted to the receiving terminal 2. In FIG. 7, each memory system 1 may be built into a host or may be connected externally. In this way, if a memory system 1, such as an SSD, and a host 3, such as a personal computer, can be electrically connected to transmit the beacon, then the memory system 1 and host 3 form a communication system.

Figure 8A:
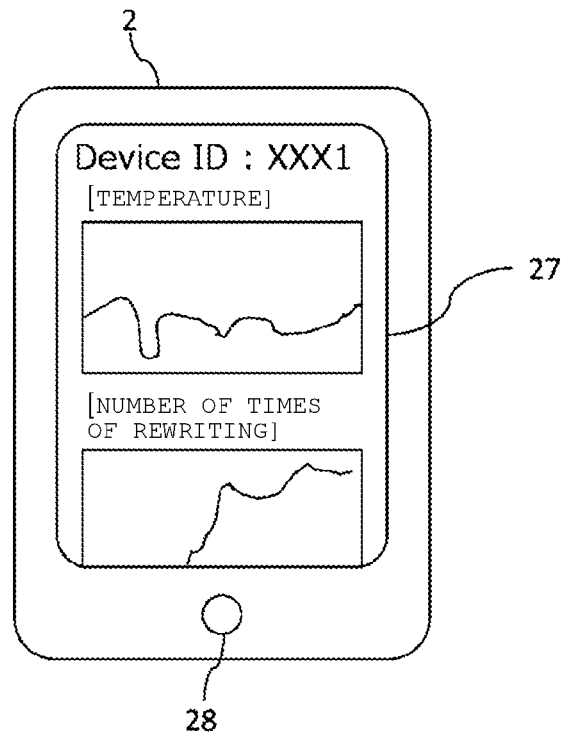
FIGS. 8A and 8B are examples of a screen displayed on a display unit of the receiving terminal, according to the first embodiment.
Figure 8B:
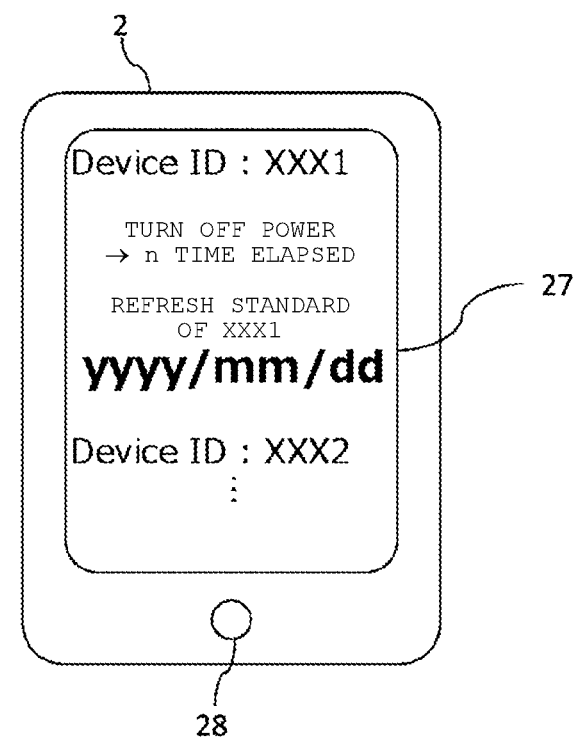

FIGS. 8A and 8B are examples of a screen displayed on the display unit 27 of the receiving terminal 2. As shown in FIG. 8A, the respective inspection items of the S.M.A.R.T. information, such as a temperature of the non-volatile memory 50 of each memory system 1 over time and the number of times of rewriting of data over time, may be shown by a graph. Further, as shown in FIG. 8B, the elapsed time since the power of the host 3 was turned off, a standard time, e.g., the alert time, for refreshing each memory system 1, and the like may be displayed. In this way, the receiving terminal 2 may be used for failure diagnosis of the memory system 1.

Next, an operation example of the memory system 1 will be described with reference to FIG. 9.

When the memory system 1 is not set in the transmission terminal 3 (No in step S11), the user waits until the memory system 1 is set in the transmission terminal 3.

Figure 9:
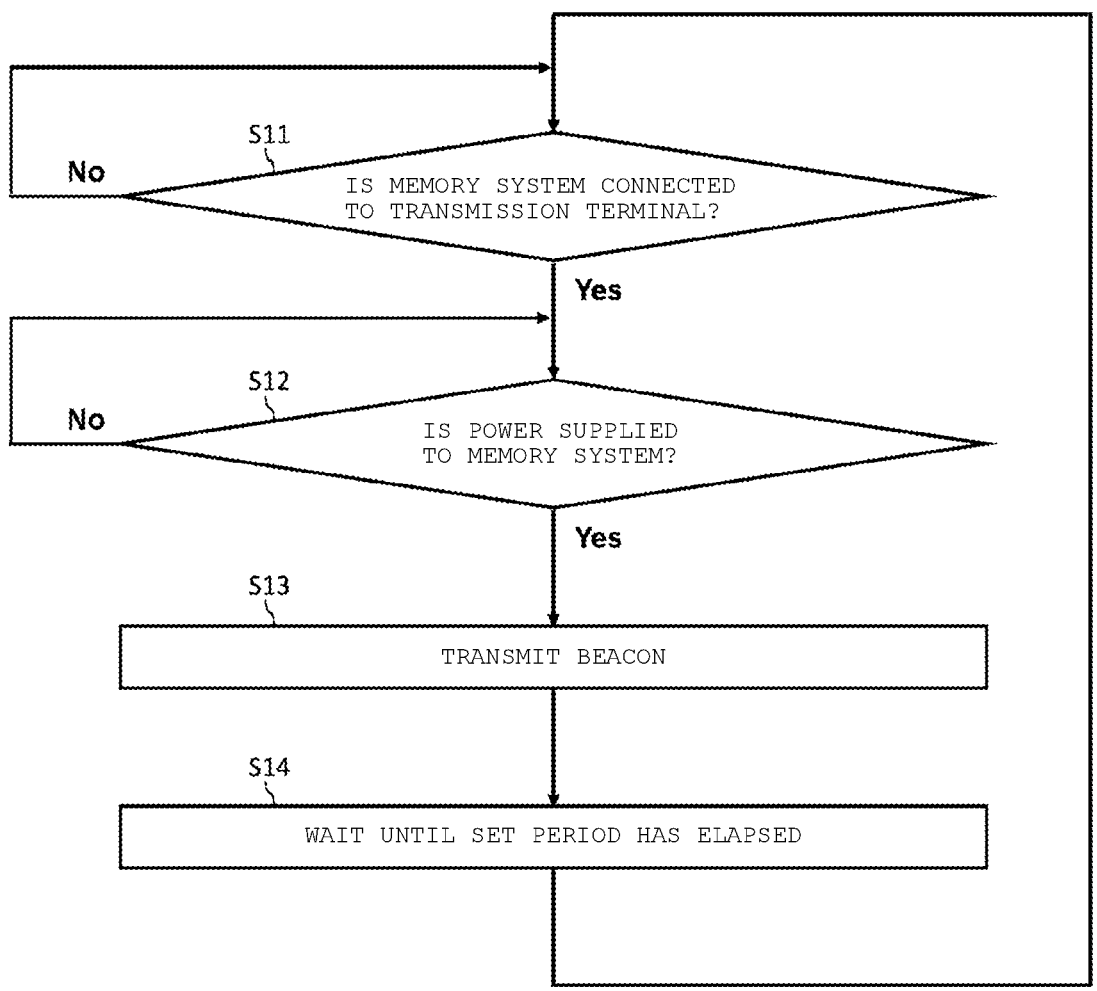
FIG. 9 is a diagram showing an operation example of a transmission terminal, according to the first embodiment.

When the memory system 1 is connected to the transmission terminal 3 (Yes in step S11), the processing of FIG. 9 proceeds to step S12.

When power is not supplied to the memory system 1 (No in step S12), the memory system 1 waits until the user turns on the power of the transmission terminal 3.

When power is supplied to the memory system 1 (Yes in step S12), the beacon including the unique ID and the S.M.A.R.T. information is transmitted to the receiving terminal 2 (step S13).

Next, the beacon period notification unit 134 waits until the set period for transmitting the beacon has elapsed (step S14), and the memory system 1 returns to step S11, and performs the same processing as described above.

Next, an operation example of the receiving terminal 2 will be described with reference to FIG. 10.

Figure 10:
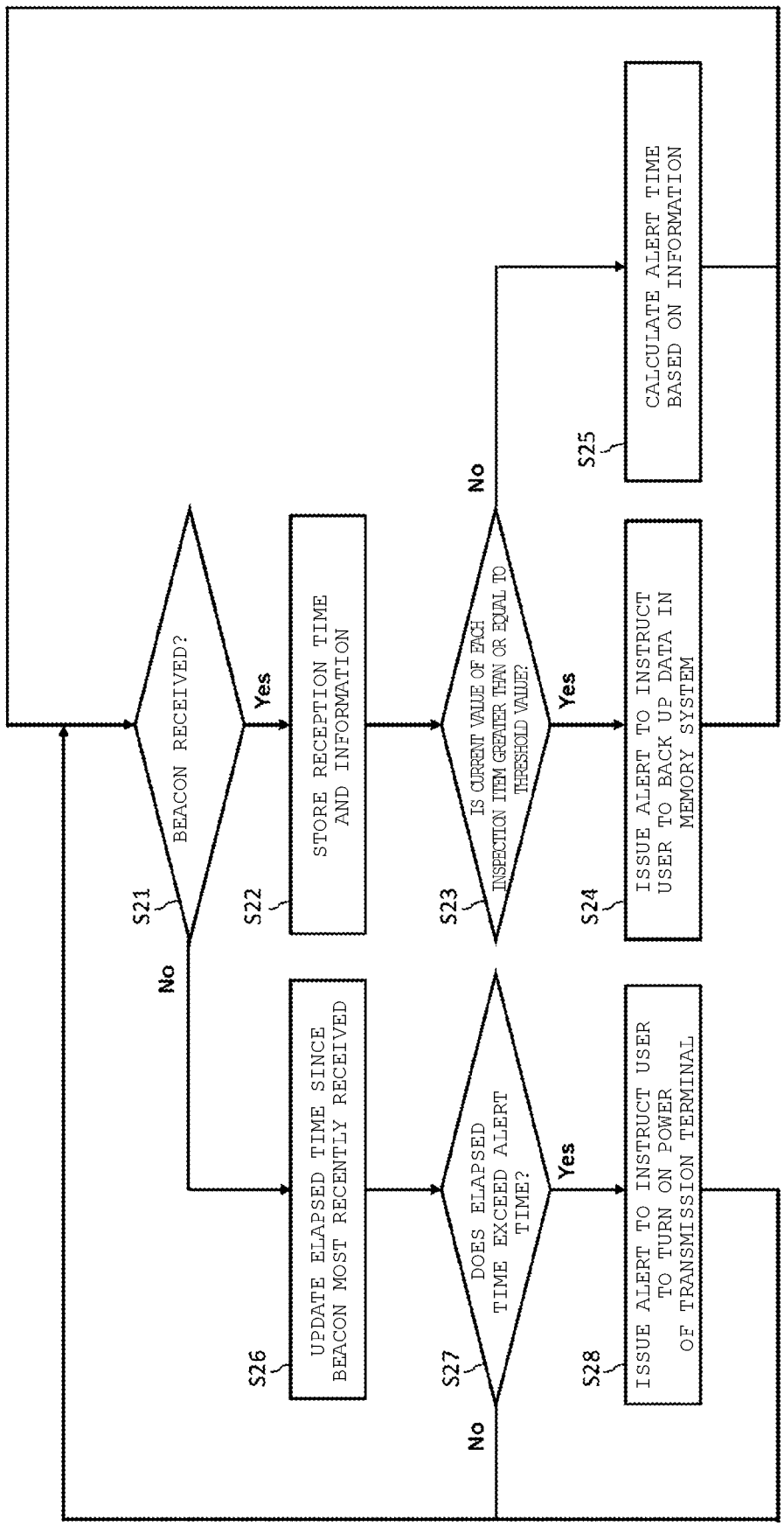
FIG. 10 is a diagram showing an operation example of the receiving terminal, according to the first embodiment.

When the beacon is received from the transmission terminal 3 (Yes in step S21), a reception time, the S.M.A.R.T. information included in the beacon, and the like are stored in the memory unit 23 while being associated with the unique ID (step S22), and the processing of FIG. 10 proceeds to step S23.

When the current value of the respective inspection items for the received S.M.A.R.T. information is greater than or equal to the threshold value (Yes in step S23), an alert is issued to instruct the user to back up the data in the memory system 1 to another storage medium (step S24). Thereafter, the processing returns to step S21 and the same processing as described above is performed.

When the current value of the respective inspection items for the received S.M.A.R.T. information is less than the threshold value (No in step S23), the alert time corresponding to the memory system 1 is calculated based on the received S.M.A.R.T. information (step S25). Thereafter, the processing returns to step S21 and the same processing as described above is performed.

When the beacon has not been received from the transmission terminal 3 (No in step S21), the elapsed time updating unit 244 calculates the elapsed time as the difference between the time when the beacon including the unique ID corresponding to the memory system 1 was most recently received and the current time, and updates the information regarding the elapsed time stored in the memory unit 23 to the latest calculated elapsed time (step S26).

When the elapsed time does not exceed the alert time (No in step S27), the processing returns to step S21 and the same processing as described above is performed.

When the elapsed time exceeds the alert time (Yes in step S27), the alert is issued to instruct the user to turn on the power of the transmission terminal 3 (step S28). Thereafter, the processing returns to step S21 and the same processing as described above is performed.

Since a flash memory such as an SD card or an SSD loses data due to natural discharge, it is required to periodically refresh the flash memory in order to keep the stored data.

The communication system of a comparative example is equipped with a function to periodically refresh the flash memory before the data stored in the flash memory is lost under the assumption that the flash memory is electrically connected to the transmission terminal. However, for example, an SD card that is removed from a camera and left disconnected for a long time has a risk of data loss because the function to periodically refreshing the flash memory cannot execute. Similarly, when the power of the transmission terminal is off, the user may not turn on the power of the transmission terminal until a time when the user becomes aware that the power of the transmission terminal is off. Because the function of periodically refreshing the flash memory cannot execute while the power of the transmission terminal is off, there is a risk of data loss in the flash memory.

According to the communication system 1000 of the first embodiment, the memory system 1 transmits the beacon to the receiving terminal 2 at regular time intervals while the power of the transmission terminal 3 is turned on. By receiving the beacon, the receiving terminal 2 can manage an energized state or internal information of the memory system 1. Further, based on the information, it is possible for the receiving terminal 2 to warn the user to turn on the power of the transmission terminal 3 before the data of the memory system 1 is lost. As a result, the risk of data loss in the memory system 1 can be reduced.

Further, even in a situation in which the memory system 1 is not connected to the transmission terminal 3, the receiving terminal 2 can warn the user to connect the memory system 1 to the transmission terminal 3 and turn on the power of the transmission terminal 3, based on the information in the beacon transmitted by the memory system 1 while power was supplied by the transmission terminal 3.

Furthermore, since the receiving terminal 2 can manage and control the states of the plurality of memory systems 1, it is not required to introduce functions for managing and controlling the states of the memory systems 1 to the transmission terminals 3 to which the memory systems 1 may be connected. Further, the functions can be implemented by the memory systems 1 and the receiving terminal 2, and it is not required to add new functions to the transmission terminals 3 to which the memory systems 1 are connected. Therefore, system introduction and management costs can be reduced.

Further, when the memory system 1 has the S.M.A.R.T. function, the beacon including the S.M.A.R.T. information can be transmitted to the receiving terminal 2. Therefore, the receiving terminal 2 can perform the failure diagnosis of the memory system 1 based on the received S.M.A.R.T. information. When the memory system 1 is likely to reach the end of its lifespan, it is possible to warn the user to back up the data of the memory system 1 to another storage medium. As a result, the risk of data being garbled due to deterioration of the memory system 1 can be reduced.

Figure 11:
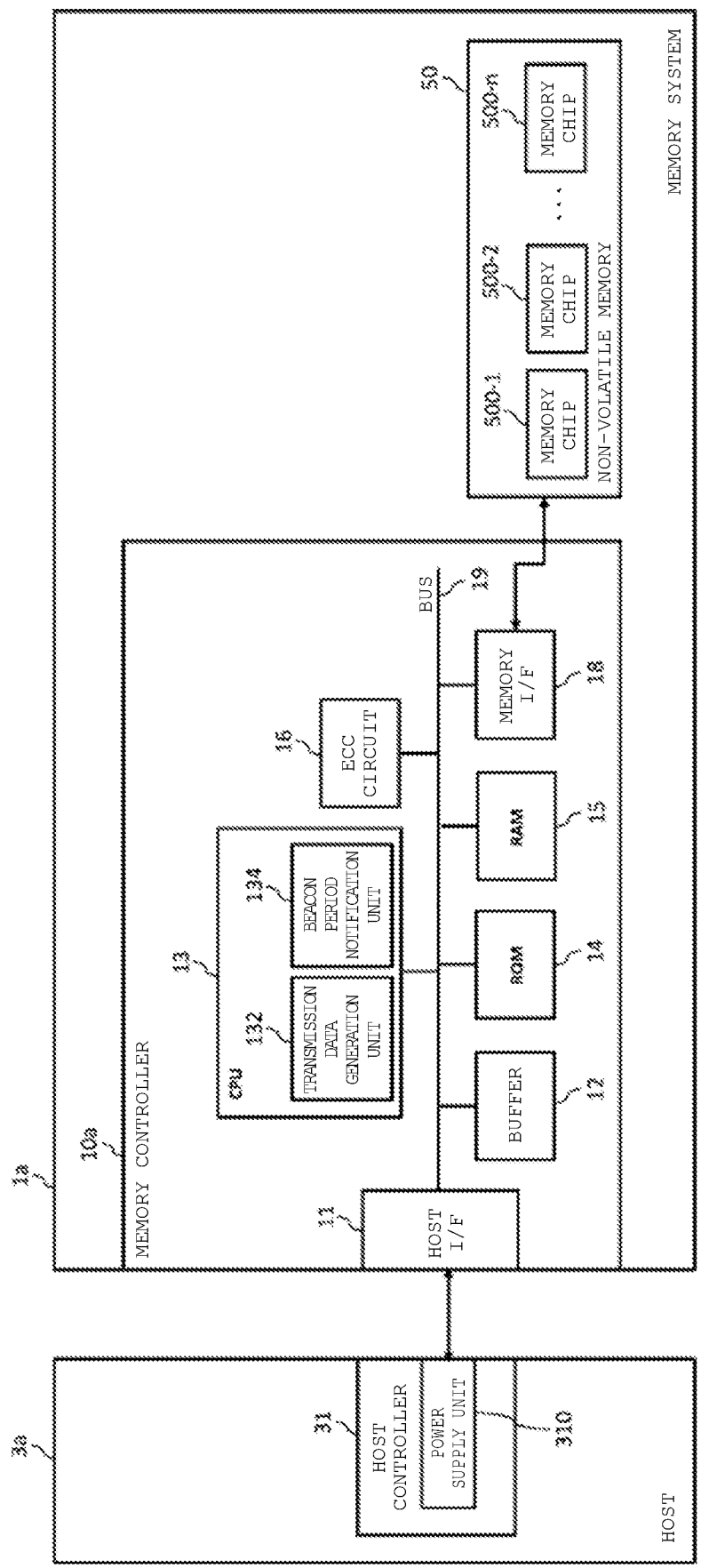
FIG. 11 is a diagram showing an example of an overall configuration of a memory system, according to a second embodiment.
Figure 12:
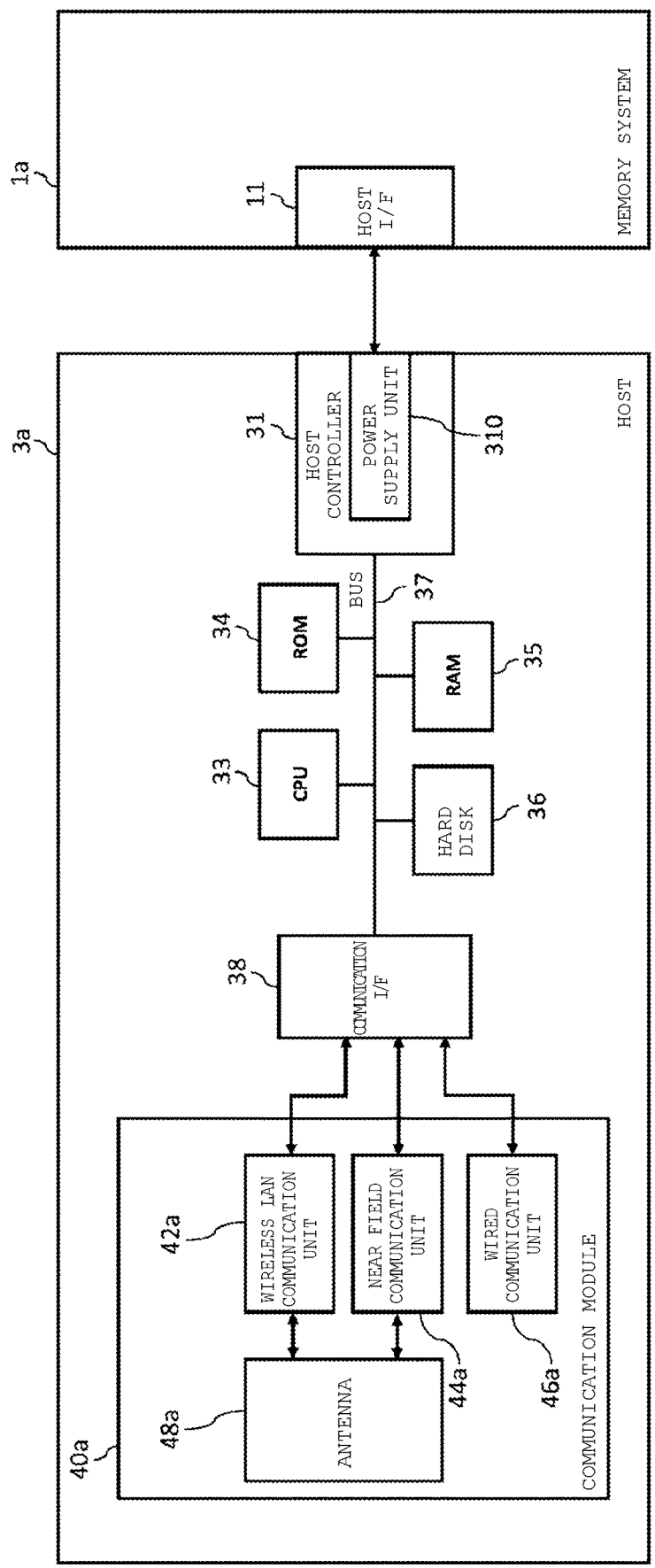
FIG. 12 is a diagram showing an example of an overall configuration of a host connected to the memory system, according to the second embodiment.

Next, a second embodiment will be described with reference to FIGS. 11 and 12. FIG. 11 is a block diagram showing an example of an overall configuration of a host 3a and a memory system 1a. FIG. 12 is a block diagram showing an example of the overall configuration of the host 3a in FIG. 11 in more detail.

Basically, a communication system according to the second embodiment has the same configuration as the communication system 1000 of the first embodiment. However, the communication system of the second embodiment is different from the communication system 1000 in that the host 3a has a communication I/F 38 and a communication module 40a instead of the memory system 1a. The communication I/F 38 is configured in the same manner as the communication I/F 17 of the first embodiment. The communication module 40a is configured in the same manner as the communication module 40 of the first embodiment. It is noted that the first and second embodiments may be combined with each other, if possible.

The host controller 31 receives the beacon generated by the transmission data generation unit 132 from the host I/F 11 and transfers the beacon to the communication I/F 38. The communication I/F 38 transfers the received beacon to the communication module 40a. The communication module 40a transmits the received beacon to the receiving terminal 2.

As described above, in the second embodiment, since a transmission terminal 3a contains the communication I/F 38 and the communication module 40a, the same effect as that of the first embodiment can be obtained even in the flash memory 1a in which the communication module 40a is not mounted.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A communication system, comprising:
 a host; and
 a memory system including a non-volatile memory and a controller configured to execute operations including writing of data to the non-volatile memory based on a request from the host,
 wherein system information is transmitted by one of the host and the memory system after a predetermined period has elapsed while power is supplied from the host to the non-volatile memory, the system information including a number that identifies either the host or the memory system that transmitted the system information and diagnostic information used for determining if there is a risk of loss of data stored in the non-volatile memory.

2. The communication system according to claim 1, wherein when the power of the host is turned on, the controller periodically performs patrol reading and refreshing of the non-volatile memory.

3. The communication system according to claim 1, further comprising:
 a receiving terminal that controls issuance of an alert based on the transmitted diagnostic information.

4. The communication system according to claim 3, wherein the memory system further includes a communication module, the communication module receiving the system information from the controller and transmitting the system information to the receiving terminal after the predetermined period has elapsed.

5. The communication system according to claim 3, wherein the host includes a communication module, the communication module receiving the system information from the memory system and transmitting the system information to the receiving terminal after the predetermined period has elapsed.

6. The communication system according to claim 3, wherein the alert issued by the receiving terminal provides an instruction to turn on the power of the host when an elapsed time since the system information was most recently received by the receiving terminal exceeds an alert time calculated based on the diagnostic information.

7. The communication system according to claim 3, wherein the system information is transmitted to the receiving terminal by wireless communication.

8. The communication system according to claim 3, wherein the receiving terminal manages a plurality of memory systems, each of the plurality of memory systems having a different identification number.

9. The communication system according to claim 3, wherein the diagnostic information includes information regarding a power-on time of the host, a number of times of writing data to the non-volatile memory, and a number of times of erasing data from the non-volatile memory.

10. The communication system according to claim 9, wherein the receiving terminal includes a display unit that displays at least one of a graph displaying the diagnostic information over time, an elapsed time since the power of the host was turned off, and a standard time for detecting data units with errors in the non-volatile memory and rewriting valid data from the detected data units to other data units.

11. The communication system according to claim 9, wherein the diagnostic information further includes a temperature of the non-volatile memory and a number of errors in a data unit of the data stored in the non-volatile memory as detected by an error checking and correcting (ECC) circuit.

12. The communication system according to claim 9, wherein the diagnostic information includes a current value and a threshold value of each of the power-on time and the number of times of writing data to and the number of times of erasing data from the non-volatile memory, and wherein an alert time is calculated based on the following Equations (1) to (4):

$$\text{Power-on time ratio} = \text{Current value (Power-on time)} / \text{Threshold value (Power-on time)} \quad (1)$$

$$\text{Number-of-times-of-writing ratio} = \text{Current value (Number of times of writing)} / \text{Threshold value (Number of times of writing)} \quad (2)$$

$$\text{Number-of-times-of-erasing ratio} = \text{Current value (Number of times of erasing)} / \text{Threshold value (Number of times of erasing)} \quad (3)$$

$$\text{Alert time} = \text{Alert time (default)} \times \{1 - (\text{Power-on time ratio} + \text{Number-of-times-of-writing ratio} + \text{Number-of-times-of-erasing ratio}) / 3\} \quad (4)$$

(Alert time (default): Optional numerical value, Threshold value: Optional numerical value).

13. The communication system according to claim 12, wherein when the current value of one of the diagnostic information is greater than or equal to the threshold value thereof, the alert provides an instruction to transfer data stored in the non-volatile memory to another storage medium.

14. A receiving terminal, comprising:
a communication interface that receives a beacon from one of a host and a memory system, the beacon containing system information including a number for identifying either the host or the memory system that transmitted the beacon to the communication interface and diagnostic information used for determining if there is a risk of loss of data stored in a non-volatile memory of the host;
a memory unit that stores a time when the beacon was most recently received through the communication interface and the system information contained by the beacon;
an elapsed-time-updating circuit that calculates an elapsed time as a difference between a current time and the time stored in the memory unit and that stores the elapsed time in the memory unit;
a calculation circuit that calculates an alert time based on the diagnostic information and that issues an alert request when the calculated elapsed time exceeds the calculated alert time; and
an alert output circuit that issues an alert in response to the alert request.

15. The receiving terminal according to claim 14, wherein the alert issued by the alert output circuit provides an instruction to turn on the power of the host.

16. The receiving terminal according to claim 14, wherein the diagnostic information includes information regarding a power-on time of the host, a number of times of writing data to the non-volatile memory, and a number of times of erasing data from the non-volatile memory.

17. The receiving terminal according to claim 16, wherein the diagnostic information includes a current value and a threshold value of each of the power-on time and the number of times of writing data to and the number of times of erasing data from the non-volatile memory, and the alert time is calculated based on the following Equations (1) to (4):

$$\text{Power-on time ratio} = \text{Current value (Power-on time)} / \text{Threshold value (Power-on time)} \quad (1)$$

$$\text{Number-of-times-of-writing ratio} = \text{Current value (Number of times of writing)} / \text{Threshold value (Number of times of writing)} \quad (2)$$

$$\text{Number-of-times-of-erasing ratio} = \text{Current value (Number of times of erasing)} / \text{Threshold value (Number of times of erasing)} \quad (3)$$

$$\text{Alert time} = \text{Alert time (default)} \times \{1 - (\text{Power-on time ratio} + \text{Number-of-times-of-writing ratio} + \text{Number-of-times-of-erasing ratio}) / 3\} \quad (4)$$

(Alert time (default): Optional numerical value, Threshold value: Optional numerical value).

18. A non-transitory computer readable medium storing a program that causes a computer to execute a method comprising:
receiving a beacon containing system information including a number for identifying one of a host and a memory system as a transmitter of the beacon and diagnostic information used for determining if there is a risk of loss of data stored in a non-volatile memory of the host;
storing a time when the beacon was most recently received and the system information contained by the beacon;
calculating an elapsed time as a difference between a current time and the stored time when the beacon was most recently received, and storing the elapsed time;
calculating an alert time based on the diagnostic information;
issuing an alert request when the calculated elapsed time exceeds the calculated alert time; and
issuing an alert in response to the alert request.

19. The non-transitory computer readable medium according to claim 18, wherein the alert provides an instruction to turn on the power of the host.

20. The non-transitory computer readable medium according to claim 18, wherein the diagnostic information includes information regarding a power-on time of the host, a number of times of writing data to the non-volatile memory, and a number of times of erasing data from the non-volatile memory.

* * * * *